Oct. 1, 1957  G. CALAMAI  2,808,180
FEED SYSTEM OF MIXTURES OF THICK OILS AND WATER AND
THE LIKE, TO SPRAY DISTRIBUTION APPARATUS
ESPECIALLY FOR OINTMENT OF TEXTILE FIBRES
Filed May 14, 1956

Giosuè Calamai
INVENTOR.

By Richardson, David and Norton
his ATTYS.

United States Patent Office 2,808,180
Patented Oct. 1, 1957

2,808,180

FEED SYSTEM OF MIXTURES OF THICK OILS AND WATER AND THE LIKE, TO SPRAY DISTRIBUTION APPARATUS ESPECIALLY FOR OINTMENT OF TEXTILE FIBRES

Giosuè Calamai, Greve, Italy

Application May 14, 1956, Serial No. 584,840

Claims priority, application Italy May 16, 1955

4 Claims. (Cl. 222—146)

The invention relates to an apparatus designed to provide the feed and distribution of oleous mixtures in general to textile fibres and particularly for the distribution of mixtures including thick oils which easily tend to solidify if mechanically stirred or strongly stirred in any manner. The apparatus allows the rapid loading and heating of the mixtures destined to be distributed to a mixer and a distributor.

The apparatus, according to the invention, substantially includes in combination: a pressurized chamber to contain a mixture to be distributed, wherein a gas, which causes the mixing, is appropriately and slowly gurgled through the mixture; a loading chamber which is pressurized after the loading of the mixture with the purpose of transferring it to said mixing chamber; a transfer conduit for the liquid between the two chambers; a pressure filter located in said conduit; heating means for the mixture, preferably combined with the heating means of the mixing chamber; a system of piping for the connection of a gas pressurized gas manifold to the various chambers of the apparatus and calibrated valves for securing of the pressures required.

The heating of the mixture to be poured into the mixing chamber may be directly obtained in the loading chamber or during the transfer.

A gurgling may be arranged in the loading chamber, for the purpose of delivering a first homogeneization of the various components of the mixture to thus avoid the stratification in the loading chamber and to thereby prevent the separate and successive passage of the various components of the mixture through the filter.

Figure 1:
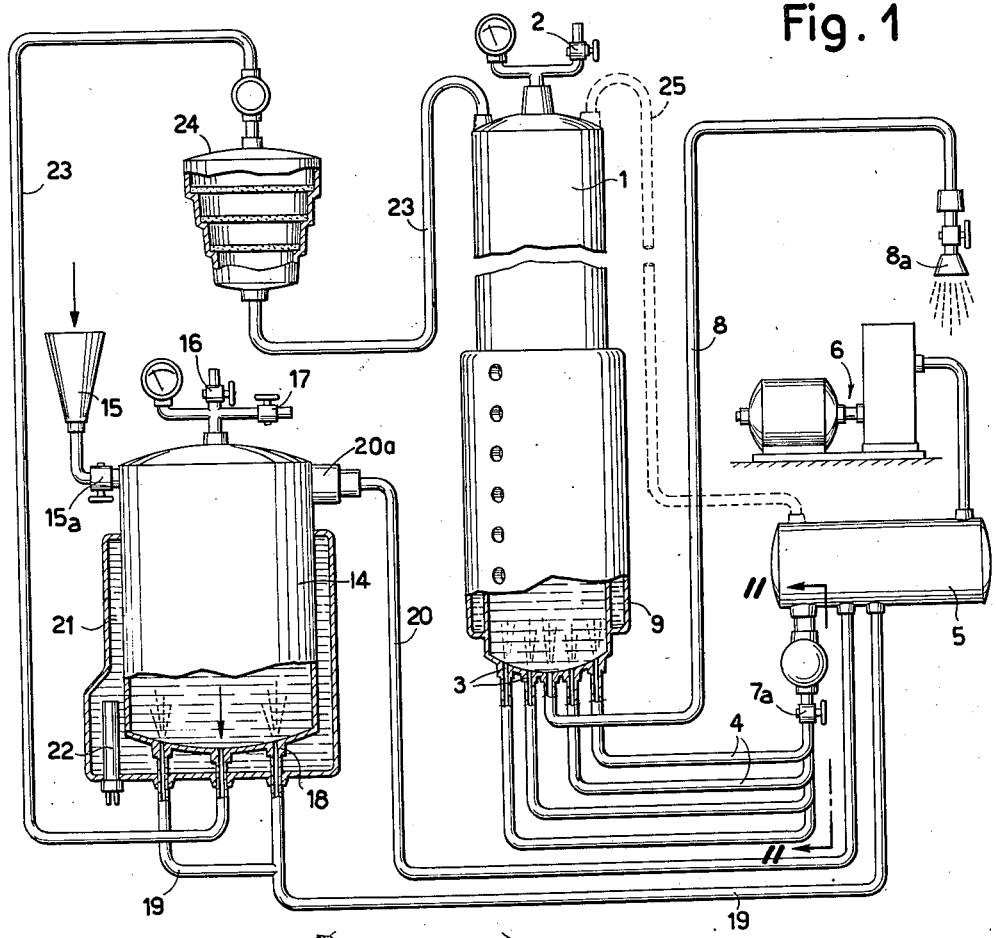
Figure 2:
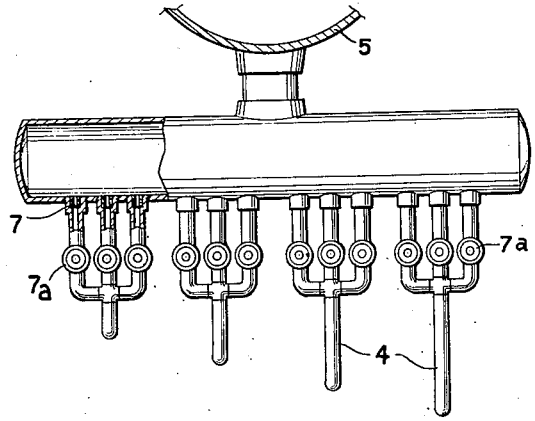

The accompanying drawing diagrammatically shows an embodiment of the apparatus according to the invention, Fig. 1 being a plant diagram and Fig. 2 being a view partly broken away and taken substantially along the line II—II of Fig. 1.

According to the drawing, 1 denotes a mixing chamber, which is provided with a calibrated exhaust valve 2 and with a plurality of nozzles 3 which are connected to conduits 4, receiving compressed air from a manifold 5 fed by a compressor 6.

The mixing chamber 1 is a pressurized tank wherein a liquid mass, according to an arrangement which is the subject of the invention's Patent No. 2,766,912, is kept stirring through a gurgling of a slightly differential pressurized gas in the same mass, said gas issuing out of the nozzles 3. The nozzles are fed through calibrated holes 7 which control the flow of air from the manifold 5. According to the drawing each conduit 4 may be fed through one or more of the three calibrated holes 7 whose fittings are controlled by associated cocks 7a for adjustment of the flow of air therethrough. Alternately there may be provided replaceable nozzles sized according to the requirements of the mixture to be stirred. A delivery conduit 8 interconnects a distributor or distributors 8a of the mixture with the bottom of the mixing chamber 1.

The mixing chamber 1 is heated by means of heated water passing through an outer jacket or by other convenient means. In the embodiment shown, around the mixing chamber there is provided a heating space 9, wherein there is positioned a heating resistor and control means. In this way it is possible to heat the chamber 1 as required. The hot water may also come from an outer source if so desired.

14 denotes a loading chamber, which is connected at its upper end to a feed hopper 15. A relief valve 16 is connected to the tank 14 for the adjustment of the pressure therein and a valved outlet pipe 17 is provided for relieving the pressure in the tank 14. Gurgling nozzles 18, fed by conduits 19, extending from the manifold 5, are arranged on the bottom of the loading chamber 14. A conduit 20 connects the manifold 5 to the upper portion of the loading chamber 14, where it is controlled by an automatic valve 20a of any known type, which is opened when a predetermined pressure is attained in the chamber 14.

A heating jacket 21 is formed around the chamber 14, or at least around the lower portion thereof, and said jacket 21 is filled with water and is heated by means of a resistor 22 or in any appropriate way, providing suitable devices to assure the discharge and feed of said jacket 21. The heating may alternatively be in the interior of the tank 14 and may be supplied with hot water from the same source which feeds the mixing chamber.

Suitable thermostats constantly control the temperature and heating.

A conduit 23 extends from the bottom of the chamber 14 to the upper portion of the mixing chamber 1 and a filter 24 is interposed in the conduit 24.

When a determined amount of mixture is to be loaded into the mixing chamber 1, the entire apparatus is relieved of pressure, by shutting down, for example, the operation of the compressor 6 or by discharging the manifold 5. By opening the exhaust 17, the liquid mass of the mixture is loaded through the hopper 15 into the tank 14. Then the cocks 15a of the hopper conduit and the conduit 17 are closed and the supply of the compressed air is started into the manifold 5 from the compressor 6, the chamber 1 being empty and the liquid mass being located in the chamber 14 at this time.

A gradual increase of the pressure now takes place in the chamber 1 and likewise in the chamber 14 through the small cross-section nozzles 7. Owing to the total cross-sectional area of the nozzles 7, a high pressure, for instance 3 atm., always higher than and finally equal to the pressure generated in the tank 14, is rapidly attained in the chamber 1. It is now possible to obtain, through the conduit 23 and the nozzles 18, a gurgling of gas through the mass contained in the tank 14, which is also heated by the jacket 21, and thus an initial mixing by gurgling takes place in the chamber 14. A determined pressure, for example of 3.00 atmospheres, is established in the chamber 1, through the calibrated valve 2, which is adjusted at a pressure lower than that attained in the manifold 5, while through the conduit 20, the pressure in the chamber 14 increases to a higher value determined by the valve 16, adjusted at a higher pressure, for example 3 atm. This is obtained after the pressure equal to that of the chamber 1 has been established in the chamber 14 and the valve 20a has been opened by this operation. Once reaching this higher pressure, the liquid of the chamber 14 is forced through the conduit 23 and through the filter 24 to the chamber 1. The mixture is filtered through the filter press 24, while the heating of said mixture is maintained in the chamber 1. Thus a transfer, heating and filtering of the mixture is obtained with a rapid operation and there is no danger of solidification nor of oleous mixtures, for example mixtures containing sulphide oil, which tend to solidify even when violently handled.

The liquid is kept stirred in the chamber 1 by the gurgling or the gas through nozzles 3 and the delivery of said liquid from chamber 1 is effected through the conduit 8 and the nozzle or nozzles such as 8a.

A rapid pressurizing of the chamber 1 may be obtained by arranging a conduit 25 as shown in dotted lines, between the manifold 5 and the upper portion of the mixing chamber 1. The conduit 25 may be used to expedite the pouring operation without any danger that the liquid, arriving from the filter 24, may find a too low back pressure in the chamber 1, which would affect the fluidity of the oil.

It is to be intended that the drawing only shows an embodiment, given only as a practical example of the invention, since the invention may be varied in the forms and arrangements shown without however departing from the scope of the invention.

What I claim is:

1. An apparatus of the character described comprising a mixing chamber, a plurality of nozzles in the lower end of said chamber, means for delivering air under pressure to said nozzles, a loading chamber, means for delivering air under pressure to said loading chamber, a valve-controlled hopper connected to the upper end of said loading chamber, a relief valve for each of said chambers, a conduit interconnecting the lower end of said loading chamber with the upper end of said mixing chamber, and a discharge pipe extending from the lower end of said mixing chamber.

2. An apparatus as defined in claim 1 wherein a filter is interposed in said conduit.

3. An apparatus as defined in claim 1 wherein heating means is provided for each of said chambers.

4. An apparatus as defined in claim 1 wherein said loading chamber is provided at its upper end with a valved discharge pipe and wherein means is provided for maintaining the pressure in said mixing chamber higher than that in said loading chamber, said means including said relief valves, a second conduit interconnecting the upper end of said loading chamber with air pressure means, and a third relief valve in said last-mentioned conduit.

References Cited in the file of this patent

UNITED STATES PATENTS

| | | |
|---|---|---|
| 2,125,913 | Goebels | Aug. 9, 1938 |
| 2,148,998 | Sackett | Feb. 28, 1939 |
| 2,509,288 | Brochner | May 30, 1950 |
| 2,597,422 | Wood | May 20, 1953 |